TANGENT KEYING DEVICES

Filed Dec. 11, 1962

Inventor
François Durand
by Michael J. Striker
Atty

United States Patent Office 3,175,852
Patented Mar. 30, 1965

3,175,852

TANGENT KEYING DEVICES

François Durand, 108 Blvd. Carnot, Le Vesinet, France

Filed Dec. 11, 1962, Ser. No. 243,841
Claims priority, application France, Dec. 14, 1961, 881,987
1 Claim. (Cl. 287—52.05)

The present invention relates to tangent keying devices for locking a hub and shaft assembly.

It is known that keying devices of this general character constitute a simple means for transforming the sliding mounting of a hub on a shaft into a tight fit, while permitting an easy assembly and removal of the hub relative to the shaft. Devices of this type comprise as a rule a pair of keys disposed tangentially in corresponding recesses consisting of complementary grooves formed in the shaft surface and in the registering bore of the relevant hub, the bottom of the hub grooves lying in a plane tangent to the hub bore, and the bottom of the grooves formed in the shaft surface lies in a parallel plane. The end walls of each groove must extend at right angles to the bottom of both grooves, one of these end walls constituting the end wall of the shaft groove and extending in a diametral plane of said shaft. On the other hand, each key consists of two sections engaging each other along a plane perpendicular to the bottom of the two grooves forming the corresponding recess. The two sections of one of the keys have a different thickness at their ends, whereby they can be wedged in their recess by being force-fitted therein, so that these two sections bear against the end walls of the corresponding recess.

However, hitherto known double-keying devices of this character require an extremely accurate machining of the grooves, both on the shaft and on the inner wall of the hub bore. In fact, the angle formed between the end walls of the two recesses, which extend internally of the hub, must be strictly equal to the angle obtaining between the opposite end walls of the same recesses, that is, those formed in the shaft proper. On the other hand, the width of the first key fitted in the hub and shaft assembly must be strictly accurate. If one of these two requirements is not met, the bearing faces of the keys will not properly engage the groove faces and the stress transmitted between the hub and shaft may subsequently damage the keys.

Under these conditions, it is the essential object of this invention to render the bearing of the key faces on the groove faces independent of possible variations in the angles formed by the relevant ends of the two key grooves and also of a possible variation in the length of the first key, due allowance being made for the normal machining tolerances.

To this end, this invention provides a tangent double-keying device for a concentric shaft and hub assembly, which comprises two keys each consisting of two complementary sections adapted to slide on each other and disposed in two groups of complementary grooves formed in the shaft surface and in the inner wall of the hub bore respectively, this device being characterized in that the two registering faces of the two sections constituting each key are curved to permit the relative jointing of these two sections.

With the foregoing and other objects in view, the invention resides in the novel arrangement and combination of parts, and in the details of construction hereinafter described and claimed, it being understood that changes in the precise embodiment of the invention herein disclosed may be made within the scope of what is claimed without departing from the spirit of the invention.

Reference will now be made to the accompanying drawing in which.

Figure 1:
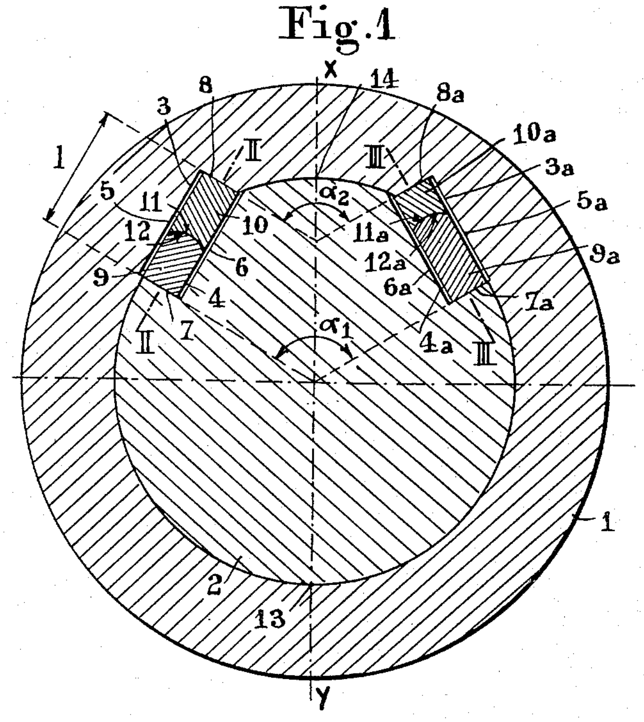
FIGURE 1 is a cross-section showing the shaft and hub elements assembled by the tangent double-keying device of this invention.
Figure 2:
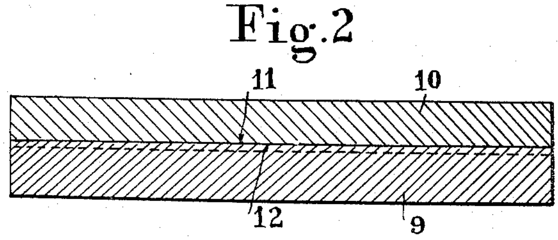
FIGURE 2 is a section taken upon the line II—II of FIGURE 1.
Figure 3:
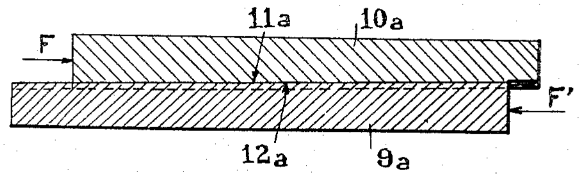
FIGURE 3 is a section taken upon the line III—III of FIGURE 1.

The hub 1 shown in FIGURE 1 is locked on the shaft 2 by means of the tangent double-keying device of this invention.

A pair of recesses each consisting of two complementary grooves 3, 4 and 3*a*, 4*a* are provided symmetrically on either side of a diametral plane X–Y, one groove being formed in the inner wall of the bore of hub 1 and the other in the cylindrical surface of shaft 2. The bottom faces 5, 5*a* of grooves 3, 3*a*, lie in a plane tangent to the inner wall of the hub bore. On the other hand, the bottom faces 6, 6*a* of grooves 4 and 4*a* formed in shaft 2 are parallel to the bottom faces of grooves 3, 3*a*. The two ends of each recess consist the one of the end wall 7 or 7*a* of grooves 4 and 4*a* formed in the shaft, and the other of the end wall 8 or 8*a* of grooves 3 and 3*a* formed in the hub. These end walls extend at right angles to the bottom of the corresponding grooves, the walls 7 and 7*a* extending in radial planes. These two end faces form therebetween an angle $\alpha 1$, and the opposite end faces 8 and 8*a* form therebetween an angle $\alpha 2$.

In each recess thus formed there is inserted a key consisting of two complementary sections designated by the reference symbols 9, 10 and 9*a*, 10*a* respectively. Each two-section key is of parallelipipedic configuration. However, the two component elements 9*a* and 10*a* of one of the keys have a different thickness at their two ends, to permit the wedging thereof by a sliding movement.

According to the essential feature characterizing the double-keying device of this invention, the faces 11, 12 and 11*a*, 12*a* of the two sections of each key which contact each other consist of curved faces, that is, part-cylindrical surfaces having their generatrices parallel to the longer sides of the keys.

For completely locking the hub 1 on shaft 2, the operator firstly positions the key 9, 10 therebetween then, by means of the other key 9*a*, 10*a*, he wedges the assembly. The wedge action resulting from the axial displacement of the key sections 9*a*, 10*a* in the direction of the arrows F and F' will wedge these two sections against the end faces 7*a* and 8*a* of the recess provided for the corresponding key, thus causing the two sections 9 and 10 constituting the first key against the end faces 7 and 8 of the recess of this first key. Thus, the shaft 2 is pressed against the hub 1 at a point 13 located on the diametral plane X–Y, so that all the play existing between the shaft and hub is located at a point 14 diametrally opposite to 13. It is clear that a slight variation in the angles $\alpha 1$ and $\alpha 2$, and also in the width 1 of the first key 9, 10 will prevent the end bearing faces, that is, faces 7, 8 and 7*a*, 8*a* respectively, from being parallel to each other. Under these conditions, the corresponding bearing faces of the two sections constituting each key would bear through an edge instead of a face, if a conventional tangent double-keying device were provided, that is, a device wherein the two key-forming sections engaged each other through a flat face instead of a curved face.

On the other hand, this inconvenience cannot take place with the device of this invention. In fact, with the device claimed herein if variations arise between the angles $\alpha 1$ and $\alpha 2$, or if a variation occurs in the width of the first key, the two sections constituting each key can rotate on each other, due to the curvature of their faces in relative engagement. Due to the normal play provided between the key thickness and the groove depth, the joint formed between the two sections of each key can serve its purpose, without causing these sections to abut against the bottom of the grooves. Thus, the two component sections of each key will automatically pivot on each other until their bearing faces engage with their complete surface the corresponding faces of the recesses provided for the two keys.

What I claim is:

A tangent double key arrangement for interlocking a concentric shaft and hub assembly comprising, in combination, two pairs of complementary grooves, each pair being angularly spaced from the other with each groove in each pair including two faces, one groove in each pair of complementary grooves being formed in said hub and having one face tangential to the inner surface of the hub and an end face substantially normal to said one face and intersecting the inner surface of the hub and the other groove in each pair of complementary grooves being formed in said shaft and having one face opposite and substantially parallel to said one face of said one groove and intersecting the shaft outer surface and an end face parallel to the end face of said one groove and intersecting the shaft outer surface and located in a plane including the shaft axis and with each pair of complementary grooves being oriented relative to the other pair so that the end faces of one pair are not parallel to the end faces of the other pair; and a pair of complementary key sections in each pair of complementary grooves, each key section having an end face abutting respectively against an end face of the complementary groove in which it is located and each of said key sections having opposite its end face thereof an abutting face abutting against the abutting face of the other complementary key section of its pair, the abutting face of one of said complementary key sections of each pair being a convexly curved face and the abutting face of the other complementary key section of each pair being a concavely curved face, whereby said key sections may tilt slightly with respect to each other so that, when said end faces of said grooves in each pair of complementary grooves are not exactly parallel to each other, said end faces of the key section may still abut over the whole area thereof against said end faces of said grooves, and at least the pair of key sections in one pair of complementary grooves tapering in longitudinal direction and opposite to one another.

References Cited by the Examiner

UNITED STATES PATENTS 118,474 8/71 Ochsner ------------ 287—52.05

FOREIGN PATENTS 1,188,322 3/59 France.

CARL W. TOMLIN, *Primary Examiner.*